United States Patent
Fryer et al.

(10) Patent No.: US 7,119,493 B2
(45) Date of Patent: Oct. 10, 2006

(54) CONTROL OF ELECTROLUMINESCENT DISPLAYS

(75) Inventors: Christopher James Newton Fryer, Cottenham (GB); Stefan Michael Ross, Westfield Lane (GB)

(73) Assignee: Pelikon Limited, Caerphilly (GB)

( * ) Notice: Subject to any disclaimer, the term of this patent is extended or adjusted under 35 U.S.C. 154(b) by 79 days.

(21) Appl. No.: 10/638,267

(22) Filed: Aug. 8, 2003

(65) Prior Publication Data

US 2005/0017650 A1   Jan. 27, 2005

(30) Foreign Application Priority Data

Jul. 24, 2003   (GB)   ................... 0317392.9

(51) Int. Cl.
*G09G 3/10*   (2006.01)
(52) U.S. Cl. ............... 315/169.3; 315/169.1; 315/291; 315/224; 315/307; 345/76; 345/212; 345/214
(58) Field of Classification Search .. 315/169.1–169.3, 315/224, 225, 291, 307, 209 R; 345/36, 345/42, 33, 45, 48, 52, 76–78, 84, 98, 211–214
See application file for complete search history.

(56) References Cited

U.S. PATENT DOCUMENTS

| | | | | |
|---|---|---|---|---|
| 3,609,748 A | * | 9/1971 | Parfomak et al. | ............ 345/36 |
| 4,595,920 A | * | 6/1986 | Runyan | ............ 345/76 |
| 4,823,121 A | | 4/1989 | Sakamoto et al. | |
| 5,191,321 A | * | 3/1993 | Herold et al. | ............ 345/76 |
| 5,311,169 A | * | 5/1994 | Inada et al. | ............ 345/77 |
| 5,583,424 A | * | 12/1996 | Sato et al. | ............ 323/282 |
| 5,923,309 A | | 7/1999 | Ishizuka et al. | |
| 6,014,116 A | * | 1/2000 | Haynes et al. | ............ 345/1.1 |
| 6,043,609 A | | 3/2000 | George et al. | |
| 6,215,462 B1 | * | 4/2001 | Yamada et al. | ............ 345/76 |
| 6,271,812 B1 | * | 8/2001 | Osada et al. | ............ 345/76 |
| 6,380,943 B1 | | 4/2002 | Morita et al. | |
| 6,509,885 B1 | | 1/2003 | Hanaki et al. | |
| 6,541,921 B1 | * | 4/2003 | Luciano et al. | ......... 315/169.3 |
| 2003/0112231 A1 | | 6/2003 | Kurumisawa | |
| 2003/0222866 A1 | * | 12/2003 | Funston et al. | ............ 345/211 |

FOREIGN PATENT DOCUMENTS

| | | |
|---|---|---|
| EP | 1 237 143 A2 | 9/2002 |
| GB | 2 106 299 A | 4/1983 |
| WO | WO 99/45525 | 9/1999 |
| WO | WO 03/069674 A1 | 9/2002 |

* cited by examiner

*Primary Examiner*—Haissa Philogene
(74) *Attorney, Agent, or Firm*—Sutherland Asbill & Brennan LLP

(57) ABSTRACT

A controller for use with a multi-segment electroluminescent display 1. Control signals C1–CN control a plurality of half H-bridges H and Hc, the terminals of the half H-bridges being connected respectively to ground and to a high voltage DC supply 9. One of said half H-bridges provides a common output Vcommon and the remaining H-bridges provide drive voltages V1–VN for the segments of the display. The H bridges are driven by an oscillator 14 so that an AC voltage is selectively applied to the segments of the display. A power supply 24 provides a predetermined amount of power per unit area of the display. This is controlled by an area summation engine 22 having a segment data input, a segment counter and a memory containing area data corresponding to the segment(s) of the display. Based on the input from the segment data input, the area(s) of the segment(s) that are to be lit are obtained from the memory and summed to provide the total area to be lit. This is fed to the power supply 24, which then feeds the correct amount of power to display 1 via the half H-bridges.

25 Claims, 4 Drawing Sheets

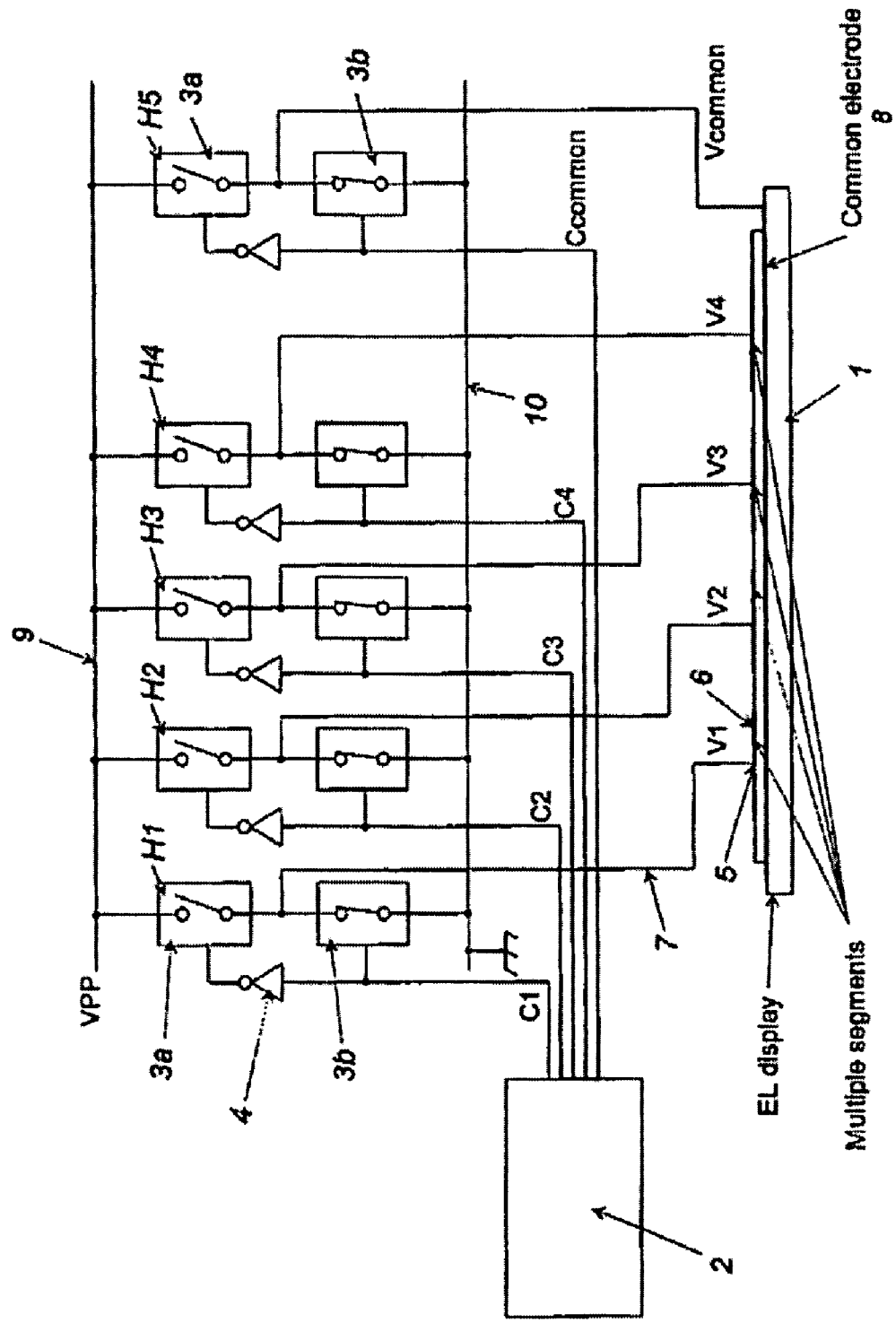
Figure 1 – Multiple segment constant power control

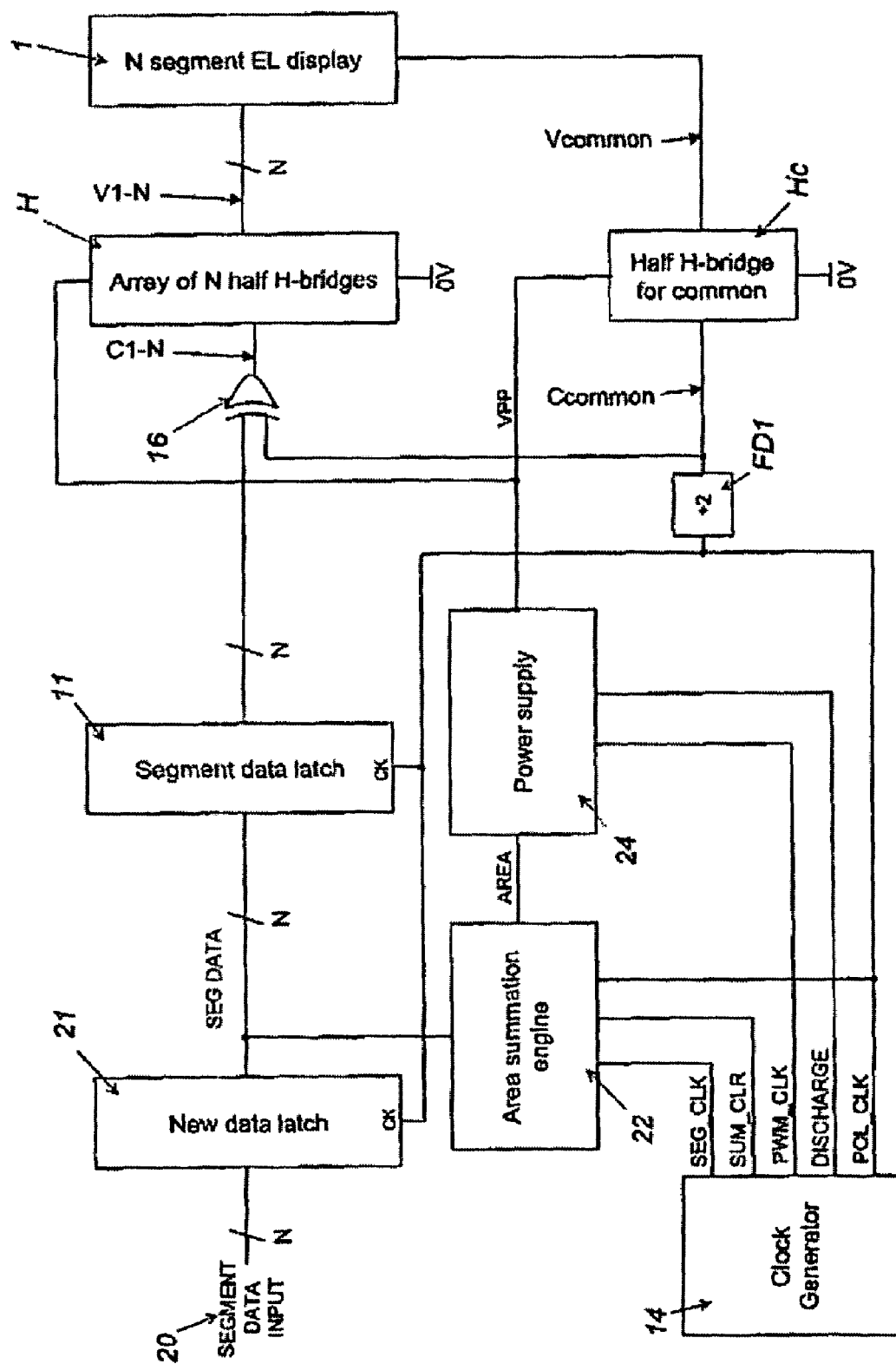
Figure 2 – N segment constant power controller

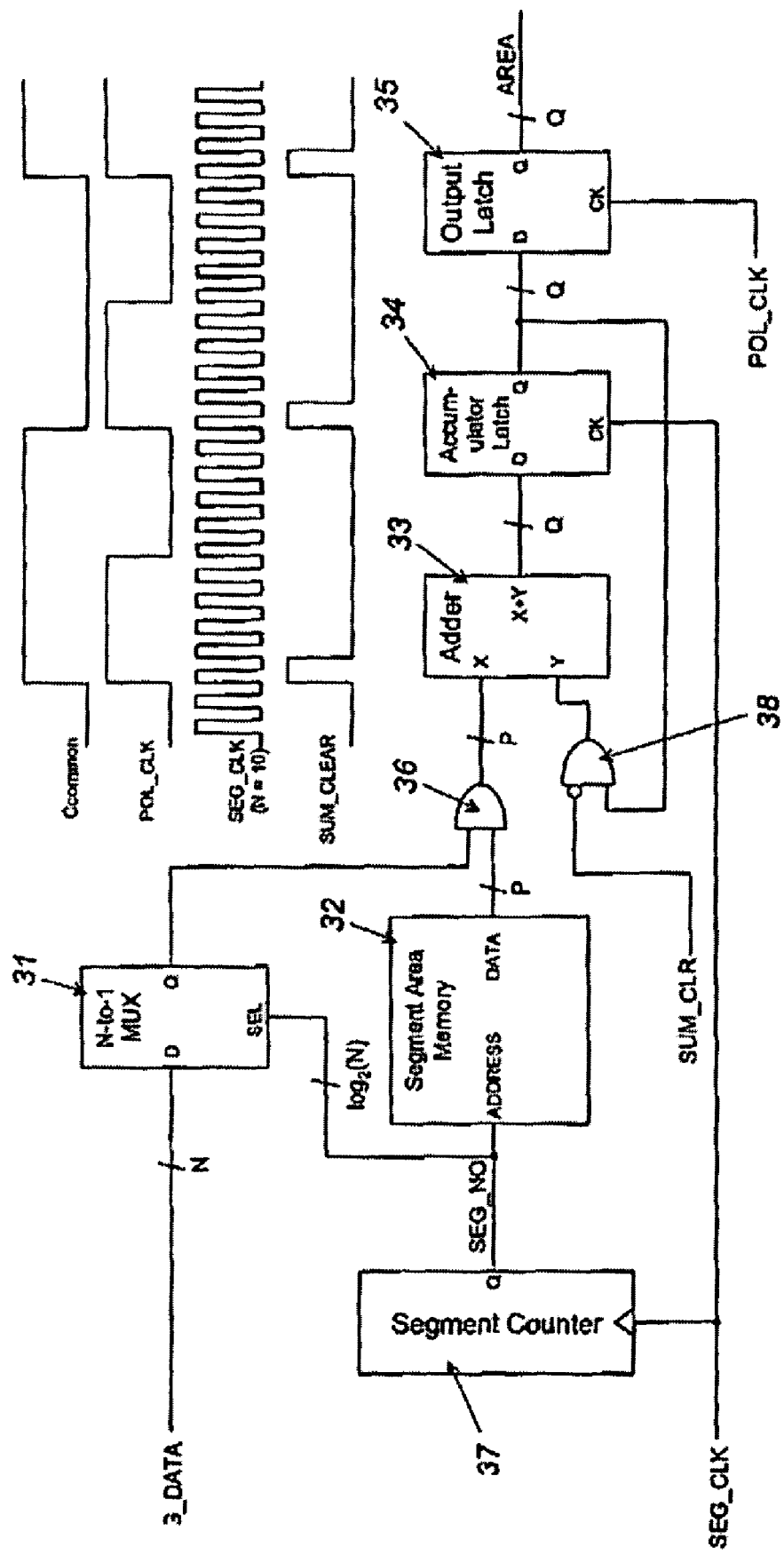
Figure 3 – Area summation engine

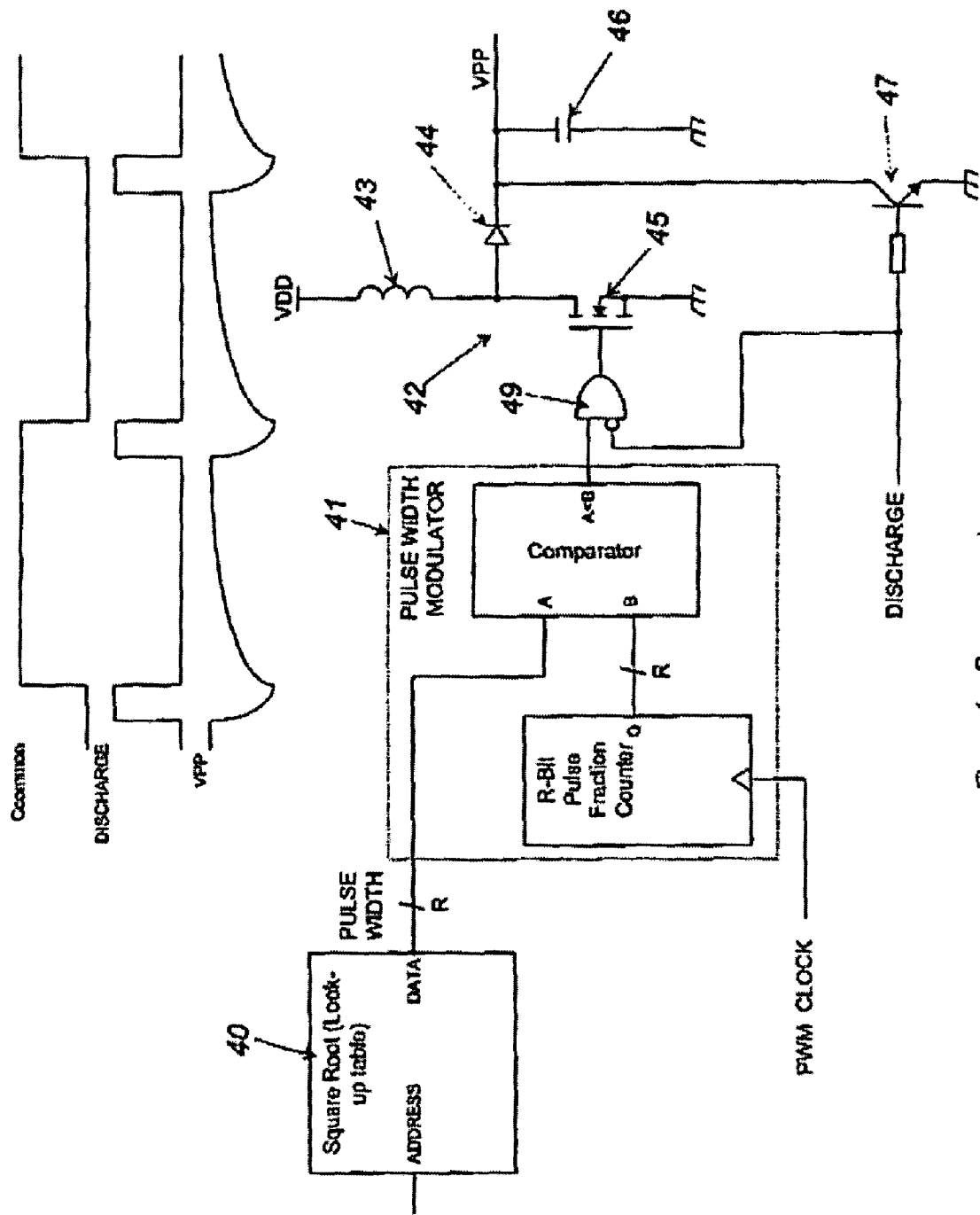
Figure 4 – Power supply

CONTROL OF ELECTROLUMINESCENT DISPLAYS

TECHNICAL FIELD

The present invention relates to electroluminescent displays and their controllers and, in particular, to the control of the power supplied by such controllers.

BACKGROUND OF THE INVENTION

Electroluminescent displays have selectively illuminable regions for displaying information. Such displays have the advantage over competing technologies that they can be large, flexible and are relatively inexpensive.

Although electroluminescent lamps were known in the 1950's, these had a short lifetime and it was not until the 1980's that a flexible electroluminescent device was developed. However, this was used as an LCD backlight and only recently have practical electroluminescent displays become available.

Electroluminescent displays generally comprise a layer of phosphor material, such as a doped zinc sulphide powder, between two electrodes. It is usual for at least one electrode to be composed of a transparent material, such as indium tin oxide (ITO), provided on a transparent substrate, such as a polyester or polyethylene terephthalate (PET) film. The display may be formed by depositing electrode layers and phosphor layers onto the substrate, for example by screen printing, in which case opaque electrodes may be formed from conductive, for example silver-loaded, inks. Examples of electroluminescent devices are described in WO 00/72638 and WO 99/55121.

An electroluminescent display of the general type described above is illuminated by applying an alternating voltage of an appropriate frequency between the electrodes of the lamp to excite the phosphor. Commonly, the phosphors used in electroluminescent displays require a voltage of a few hundred volts. Typically, such electroluminescent displays may have a capacitance in the range 100 pF to 1 µF.

Since only a small current is required, this comparatively high drive voltage can easily be produced from a low voltage DC supply by a circuit such as the well known "flyback converter".

This comprises an inductor and an oscillating switch arranged in series. In parallel with the oscillating switch, a diode and a capacitor are arranged in series. The switch oscillates between an open state and a closed state. In the closed state, a current flows from the DC supply through the inductor and the switch. When the switch is opened, the current path is interrupted, but the magnetic field associated with the inductor forces the current to keep flowing. The inductor therefore forces the current to flow through the diode to charge the capacitor. The diode prevents the capacitor discharging while the switch is closed. The capacitor can therefore be charged to a voltage that is higher than the DC supply voltage, and current at this voltage can be drawn from the capacitor.

In order to supply an alternating current to a load from a flyback converter, an H-bridge may be provided in parallel with the capacitor. In general, an H-bridge comprises two parallel limbs, each limb having a first switch in series with a second switch. On each limb between the first and second switches, there is a node, and the load is connected between the respective nodes of the limbs. Current can flow through the load in one direction via the first switch of one limb and the second switch of the other limb and in the other direction via the other two switches. The switches of the H-bridge are operated so that current flows through the load first in one direction and then in the other.

Where multiple electro-luminescent segments are provided to form a display, the segments are controlled by having a single high voltage rail of constant voltage that is selectively switched across the segments that are required to light. This is achieved by using a half H-bridge transistor configuration to drive a common, usually front, electrode and a number of half H-bridges to drive each of the multiple segments. The common electrode will be switched at a frequency in the region of a few tens of hertz to a few kilohertz. Segments that are not required to light will be driven with the same signal as the common electrode such that they see no net voltage. Segments required to light will be driven at the same frequency but in anti-phase with the common electrode such that they see an alternating voltage of peak-to-peak value that is twice that of the high voltage rail. This enables simple control of which segments light by control of the phase of their driving signals.

The brightness of all of the segments can be controlled by varying the voltage of the high voltage rail and/or by varying the switching frequency. The brightness of the segments increases with frequency. The constant voltage on the high voltage rail is usually achieved by means of a feedback loop that monitors the voltage and adjusts input power to eliminate variations. This arrangement is effective, but it does have some significant drawbacks. In particular, in some circumstances the display may be required to change rapidly leading to a sudden change in the power required to supply it. For example, the display may be required to change from having most segments lit to having few or none lit. This may lead to problems in regulating the voltage accurately. In addition, because it relies on maintaining a constant voltage on the supply rail regardless of load, the known arrangement tends to be rather inefficient in its use of power and this may be critical in the case of battery-operated devices.

SUMMARY OF THE INVENTION

According to the invention there is provided a controller for an electroluminescent display, the controller being arranged to determine the amount of power required by the display for the demanded display output and to supply approximately that amount of power to the display.

Thus, by means of the invention the power supply is controlled so as to deliver the correct amount of power into the system for a given display output. This enables the prior art feedback voltage control loop to be eliminated.

The invention also extends to a corresponding method and so, viewed from another aspect, there is provided a method of controlling an electroluminescent display wherein the power supply is controlled so as to deliver the correct amount of power into the system for a given display output.

The manner in which the required amount of power is determined can vary according to application. For example, a look-up table may be provided giving the required power for every possible display configuration. However, in the case of displays having many segments this may not be practicable and so preferably the required power is determined based upon the number of display segments that is to be illuminated.

In a simple case where each segment has a similar area it is thus necessary only to multiply the number of segments to be illuminated by the power required per segment. However, in the case of more complex displays having segments of a variety of shapes and sizes, the controller preferably determines the amount of power required based upon the area of the individual segments that are to be lit. Where all segments are to be lit to the same brightness it is clear that the power required can be determined by multiplying the area of segments to be lit by the power required per unit area. In a preferred embodiment of the invention the controller comprises an area summation engine comprising a segment data input, a segment counter and a memory containing area data corresponding to the segments of the display, wherein based on the input from the segment data input, the areas of the segments that are to be lit is obtained from the memory and summed to provide an output corresponding to the total area to be lit. (It is to be appreciated that the output need only be a signal in a suitable form to allow for the operation of the controller; there would normally be no output in recognised units of measurement.)

This arrangement can also be effective where segments are to be illuminated at different levels of brightness. If the brightness of segments were to be varied by causing a lower voltage to be applied to certain segments then this could be accounted for by multiplying the area of segments to be lit at such a lower level by a lower power per unit area value or by any equivalent adjustment.

However, preferably the controller is arranged to vary the relative phase of signals applied to illuminated segment(s) of the display whereby the brightness of the segment(s) can be varied. By varying the phase of the signals, the controller of the invention can selectively turn each segment on or off during every cycle of the oscillator in order to set the segment to a desired brightness. Maximum brightness is achieved by turning a segment on every cycle, half-maximum brightness by turning it on half of the time and so on.

This is an effective method of varying display brightness because the optical emission from powder electroluminescent displays has a fast time response of the order of tens of microseconds. This is much faster than the response of the human eye. It is, therefore, possible to provide accurate control of the brightness by illuminating segments for a controlled fraction of the time without introducing a visible flicker. In the context of the present invention, therefore, the area of the display that is to be illuminated is preferably determined every cycle. This enables it to take into account the cycle-by-cycle changes used to control brightness as described above. Preferably, therefore, the controller of the invention applies a substantially constant power per unit area of segments illuminated at any given instant.

The inventors have recognised that providing constant power per unit area to an electroluminescent display has a further and highly significant advantage. Powder electroluminescent displays have a limited lifetime and their sensitivity gradually decreases. That is, for a constant voltage and frequency of drive, the brightness of the display diminishes with increased usage. It has been noted that this reduction in sensitivity is accompanied by a reduction in capacitance of the display elements. Since the energy taken by a capacitive load is given by $E=CV^2/2$, if power is kept constant, the voltage across the load increases as the capacitance decreases. Brightness increases with applied voltage and so this results in at least partial compensation for the reduction in sensitivity. Thus, this preferred aspect of the invention provides a significant increase in useable display lifetime.

This concept is itself regarded as being inventive and so, viewed from another aspect, the invention provides a controller for an electroluminescent display, wherein the controller is arranged to provide constant power per unit area of illuminated segments of the display.

Thus, the controller allows applied voltage to increase as the capacitance of the display decreases with time, thereby increasing display lifetime as explained above. Furthermore, it also compensates for variations in display capacitance due to manufacturing process tolerances.

It is recognised that the decrease in sensitivity is not completely compensated for by the increase in voltage that occurs automatically if power per unit area is maintained constant and so in applications where it is important to maintain display brightness the controller preferably further compensates for the decrease in sensitivity of the display by providing a controlled increase in drive voltage. Since the aging characteristics of electroluminescent displays are known this could be achieved by measuring the service life of the display, e.g. by using a counter connected to the oscillator that provides timing signals in a typical controller.

However, rather than rely on the predicted performance of a display, it is preferable to measure the actual decrease in sensitivity. This is preferably done by measuring the voltage achieved on the load by the application of a known amount of energy. This achieved voltage, the amount of energy applied and knowledge of the area being driven can be used to estimate the capacitance per unit area of the display. This capacitance is closely related to the age of the display so further compensation of the fall in sensitivity due to ageing can be achieved by increasing the applied power. This results in further increased service life.

This relates to a still further aspect of the invention that provides a controller for an electroluminescent display, the controller being arranged to determine the sensitivity of the display segments and to drive the elements at a voltage that provides a desired level of output brightness. Preferably the arrangement is such that the output brightness is maintained substantially constant throughout the useful life of the display.

Many multiple segment displays have features which result in different usage profiles for different segments in the display. An example would be a seven segment display for a clock where, the segments that make up each digit are, on average, illuminated for significantly different lengths of time; the bottom left segment is illuminated for 40% of the time, the bottom right is illuminated for 90% of the time. If all segments are driven in the same manner then differential ageing will result in these segments being significantly different brightnesses towards the end of display life.

The present invention may therefore be applied in combination with the ability to light segments at different brightness to compensate this effect resulting in uniform segment brightness. Thus, a segment that has had greater usage may be driven to a higher nominal brightness. The usage may be predicted, for example based on the percentages above, or measured. Alternatively, the capacitance of an element may be measured and used to determine how much it has aged. The provision of different brightnesses may be achieved by driving each segment at a calculated power (and hence voltage), e.g. by driving each for a short period in turn. However, it is preferable to equalise the brightness of the segments by driving them to different nominal brightnesses by varying the phase of their control signals as discussed above.

This concept provides a further aspect of the invention which is a controller for an electroluminescent display having a plurality of elements which are subject to differential ageing, the controller being arranged to drive the elements so as to compensate for said differential ageing such that the elements are illuminated at substantially equal brightness throughout the useful lifetime of the display. The compensation may be achieved by, for example, supplying different voltages or varying the phase of the control signals as discussed above.

The invention is applicable to controllers having a variety of power supply systems. As noted above, it is normal practice to use a flyback converter to provide a comparatively high voltage from a low voltage input. Conventionally, the output from the flyback converter feeds into a large reservoir capacitor (having a capacitance much larger than that of the display that is to be driven). This smoothes out the load on the power supply and prevents a significant voltage drop. In such an arrangement, a power controller could be placed between the reservoir capacitor and the load.

Preferably, however, the controller comprises a power supply without a large reservoir capacitor such as that described in the applicant's patent application WO 02/069674. In such a circuit, a capacitor having a capacitance that is significantly smaller than that of the load is provided so that the voltage at the output of the controller is allowed to "collapse" every cycle with the result that the display segments are partly charged directly from the inductor of the flyback circuit. Such power supplies are advantageous in themselves because they draw less power for a given display brightness. In the present context they have a particular synergy with the invention because they can conveniently be controlled to provide the desired power output by controlling the switch associated with the inductor in the flyback circuit.

Thus, preferably the controller comprises a power supply having a flyback circuit wherein a flow of current through an inductor is selectively interrupted in order to provide a sufficiently high voltage output to drive an electroluminescent display the interruption of the current being controlled so as to provide a desired output power. As noted above, it is particularly preferred that the output voltage is arranged to collapse every cycle.

Preferably, the flow of current through the inductor is controlled by an electronic switch such as a MOSFET transistor that is in turn controlled by signal pulses, the width of the pulses being modulated to determine the output power from the controller.

The invention also extends to methods of controlling an electroluminescent display corresponding to the aspects of the invention described above and/or using the controllers described above.

These controllers are intended to be used in combination with an electroluminescent display and so, viewed from another aspect, the invention provides an electroluminescent display in combination with a controller as described above.

These and other features of the present invention will become apparent upon review of the following detailed description of the invention when taken in conjunction with the drawings and appended claims.

BRIEF DESCRIPTION OF THE DRAWINGS

Certain embodiments of the invention will now be described, by way of example only, with reference to the accompanying drawings:

FIG. 1 is a schematic diagram illustrating the interconnections between a controller according to the invention and a display;

FIG. 2 is a schematic diagram showing the operation of the control unit of the controller of FIG. 1; and FIG. 3 is a schematic diagram of the area summation engine of the controller; and FIG. 4 is a schematic diagram of the power supply of the controller.

DETAILED DESCRIPTION OF THE INVENTION

FIG. 1 shows a controller having the combination of output drivers required for a four-segment display 1. Control unit 2 is connected to five half H-bridges H1–H5 by conductors carrying control signals C1–C4 and Ccommon. Each half H-bridge comprises a pair of switches 3a, 3b in the form of MOSFET transistors and an inverter 4. The transistors are controlled by control signals C1–C4, the arrangement being such that when one switch of a pair is open, the other is closed.

The centre of each of half H-bridges H1–H4 is connected to the drive electrode 5 of one segment 6 of the display 1 via a conductor 7. The centre of half H-bridge H5 is connected to common electrode 8. The common electrode is made of a transparent conductive material and is connected to each segment in the known manner.

In addition, the half H-bridges are connected to a high-voltage supply 9 and to ground 10.

Control signals C1–C4 and Ccommon control the states of their respective half H-bridges H1–H5 such that the display drive signals (V1–4 and Vcommon) swing from 0V for a low-level control signal to the high voltage (typically in the region 50V to 250V) for a high-level control signal.

Control signal Ccommon is a simple square wave of a constant frequency (100–2000 Hz). It is fed to half H-bridge H5 so that switches 3a and 3b of that device regularly open and close such that the common electrode 8 is repeatedly connected to ground (as shown) and then to the high voltage supply 9.

When a given segment is to be illuminated to full brightness, it is driven in anti-phase to Ccommon and when it is not to be illuminated it is driven in phase. Thus, none of the segments in FIG. 1 are illuminated at the instant shown (all have OFF control signals fed to them). To illuminate them, switches 3a would be closed and 3b opened by supplying suitable signal pulses C1–C4 when H5 is as illustrated. Then, when Ccommon causes H5 to connect the common electrode to the high voltage supply 9, switches 3a and 3b of H1–H4 revert to the configuration illustrated, thereby reversing the polarity of the element. This process repeats as long as the element is to be illuminated. It will be seen that when the segments are illuminated they are effectively being driven by an AC voltage of twice the rail voltage at the frequency of Ccommon. They are being turned ON every cycle of Ccommon but because the limitations of the human eye the segments appear to be continuously lit.

It is also possible to set elements to different levels of brightness. This is done by driving the elements so that they are only ON for a portion of the cycles of Ccommon. This involves the use of patterns of ON and OFF signals that repeat over a certain number of cycles. The number of cycles is chosen to allow a sufficient degree of variation in the display brightness whilst not excessively reducing the drive frequency of the elements (providing an ON signal only half of the time to provide half brightness is equivalent to halving the drive frequency).

As an example, consider a set of control signal patterns C(0)–C(3/3) that would be applied to produce brightness levels of 0, 1/3, 2/3 and 3/3 of full brightness for the respective segment. Each pattern repeats after three cycles of the Ccommon signal. C(0) provides a signal that is always in phase with Ccommon. As a result, the segment is off.

C(3/3), in contrast, is always in anti-phase with Ccommon and so the segment is lit at maximum brightness. C(1/3) is in anti-phase with Ccommon once every three cycles, providing one-third brightness and C(2/3) is in anti-phase twice every three cycles providing two-thirds brightness. The number of levels of brightness may be increased by increasing the number of cycles of the common electrode signal Ccommon after which the patterns repeat. To provide M different levels of brightness (including "off" as one level) the control signals corresponding to groups of M-1 cycles form each repeating pattern.

In FIGS. 2–4 a convention is used, whereby a connection crossed through with a slash "/" indicates a plurality of such connections in parallel, the number being indicated nearby.

FIG. 2 shows a controller for driving an N segment display. If N is taken to be four then this controller can be that used in FIG. 1. In this case, the array of half H-bridges H in FIG. 2 represents the half H-bridges H1–H4; half H-bridge Hc represents H5 (for driving the common electrode); the display 1 corresponds to the display 1 of FIG. 1 plus segments 6 and electrodes 5,8; and the remaining components form control unit 2.

Clock Generator 14 generates all of the clock signal and control signals for the controller typically from a single high frequency clock in the well known manner. The relative timing of these signals is shown on FIGS. 3 and 4. Clock Generator 14 provides a clock frequency signal POL_CLK at 100–2000 Hz that is fed via a frequency divider FD1 to half H-bridge Hc in order to produce the drive signal Vcommon for the common electrode 8 of multi-segment display 1. FD1 divides the frequency of POL_CLK by two. The same signal is also fed to one input of each of a plurality of XOR (exclusive or) gates 16, one of which corresponds to each segment of the display. The output from each XOR gate is fed to a respective half H-bridge Hi etc. (part of array H) that provides the drive signal V1 etc. to the corresponding segment's drive electrode.

Each H-bridge of the array H and Hc is connected to a 0V ("ground") rail and to a high voltage rail that is supplied by Power Supply 24.

The other input to each XOR gate 16 is from segment data latch 11 which determines when each segment is to be illuminated and the input to the XOR gate is set accordingly. Control signals C1 etc. are inverted by the Ccommon signal by means of the XOR gates 16.

The controller receives its control inputs (i.e. data indicating what segments are to be lit) at Segment Data Input 20. This comprises N parallel inputs, i.e. one for each segment of the display. New data for the segments is held in New Data Latch 21 and is fed to Area Summation Engine 22 (as SEG_DATA) where calculations are performed and to Segment Data Latch 11. The two latches operate from the signal POL_CLK. This means that data present on the latch inputs is transferred to the outputs on the rising edge of POL_CLK. The Area Summation Engine is driven by a signal SEG_CLK, at a frequency N times higher than POL_CLK (shown in FIG. 3) so that it can perform a calculation taking into account each of the N segments of the display.

These calculations, typically take one half cycle of the Ccommon control. At the end of this half cycle, a new lit area value (AREA) is available for use in determining the correct power with which to drive the display. This value is then sent to the Power supply 24 which in turn provides an output VPP of the desired power to half H-bridges H and Hc. At the same time (on the rising edge of POL_CLK) the new segment data is transferred to the Segment Data Latch 11 so that it is used to light the display. In this way, new segment data is temporarily held in the New Data Latch 21 whilst the Area Summation Engine 22 calculates the power required to drive the new set of display segments prior to the data being shown on the display.

By means of the arrangement described above, the power output from the power supply 24 is set to provide a predetermined level of power per unit area of the display that is to be illuminated. This is achieved by the Area Summation Engine 22 determining the area of segments to be lit based upon the segment data that is input at 20 and the known areas of the segments of the display.

The operation of the Area Summation Engine 22 will now be described in more detail with reference to FIG. 3. As mentioned above, this engine runs from a clock source (SEG_CLK) of frequency N times higher than that used to swap the polarity of the drive to the display (POL_CLK).

The function of the Area Summation Engine 22 is to accumulate the areas of each of the segments that the controller is required to light. The area of each of the segments is stored in the Segment Area Memory 32 in binary form, P bits for each segment. The selection of the number of bits, P, determines the accuracy with which the area data is stored. The Area Summation Engine 22 steps through each segment in turn by means of a Segment Counter 37. The value of this Segment Counter (SEG_NO) is used to select the corresponding data bit of the Segment Data by means of the Multiplexer 31. The value of the Segment Counter (SEG_NO) is also used to address the Segment Area Memory 32. P bits of addressed data from the Segment Area Memory 32 are then multiplied by the selected data bit of the Segment Data by means of the plurality of AND gates 36. The result of this multiplication is passed to the accumulator formed by the Adder 33 and Accumulator Latch 34. If a segment is required to light then its corresponding data bit in Segment Data will have the value '1' and its area (previously stored in the Segment Area Memory 32) will be added to the sum in the Accumulator Latch 34. If a segment is not required to light then its corresponding data bit in Segment Data will have the value '0' and no change will be made to the value in the Accumulator Latch 34. Note that the value from the Accumulator Latch 34 is multiplied by zero (by means of the plurality of AND gates 38 and the inversion of the SUM_CLR signal) for the first of the N segments to effectively clear the accumulator. At the end of a cycle of POL_CLK (half cycle of Ccommon) all segments will have been checked and the areas of those lit accumulated. At this time this new total area value (AREA) is clocked into the Output Latch 35. The number of bits, Q, required to store this total depends on the number of segments N, and the number of bits for each area value P.

The result of the foregoing is that Output Latch 35 contains a value AREA for the area of segments that are to be lit. This is sent to power supply 24 via Q parallel connections.

The power supply is now described in detail with reference to FIG. 4. The circuit takes the AREA data input and determines the square root of the lit area at 40, either by calculation in the well known manner or by use of a look-up table. This provides as an output a value PULSE_WIDTH (in binary form using R-bits) which is fed to Pulse Width Modulator 41. This value corresponds to the correct pulse width (PULSE_WIDTH) to drive the fly-back converter shown generally at 42. The flyback converter comprises an inductor 43, a diode 44 and a MOSFET 45.

The output from the flyback converter provides VPP which is fed to the half H-bridges as discussed above. A smoothing capacitor 46 is provided in parallel with the load.

This smoothing capacitor is selected to have significantly less capacitance than the load to ensure that it controls voltage overshoot upstream of the H-bridges without significantly increasing the energy required to charge the load.

The power supply 24 runs from a high frequency clock source PWM_CLK. The pulse width modulator 41 here produces a number of pulses for each half cycle of Ccommon in the region 10 to 500. Each pulse has a duty cycle PULSE_WIDTH/2^R. The clock signal PWM_CLK will have a frequency typically in the region 100 kHz–10 MHz. It is not necessary that the clock signals that drive the pulse width modulator be synchronous with the clock signals that drive the rest of the controller. However, in certain embodiments this may be advantageous, particularly for simplicity of clock generator design and to avoid fractions of pulses being applied to the fly-back circuit.

A Discharge circuit 47 is provided to discharge the load and smoothing capacitor to ground just prior to changing the Ccommon signal. This reduces power dissipation in the high-voltage array switches and produces a controlled discharge path. It is possible to allow the load to discharge on the change of Ccommon but the discharge paths involved are ill controlled, result in large current peaks which may lead to electromagnetic interference with other parts of product circuitry.

The output from the pulse width modulator is fed to the flyback converter via AND gate 49. The other input to this gate is an inverted input from the DISCHARGE signal. This has the result of disabling the output of Pulse Width Modulator 41 during the discharge period to avoid wasting energy.

It should be apparent that the foregoing relates only to the preferrred embodiments of the present invention and that numerous changes and modifications may be made herein without departing from the spirit and scope of the invention as defined by the following claims and the equivalents thereof.

We claim:

1. A controller for an alternating current driven electroluminescent display, the controller being arranged to determine the amount of power required by the display for the demanded display output based upon an area of an individual segments(s) that is to be lit and to supply approximately that amount of power to the display.

2. A controller as claimed in claim 1, wherein the required power is determined based upon the number of display segment(s) that are to be illuminated.

3. A controller as claimed in claim 1, the controller comprising a power supply having a reservoir capacitor with a capacitance which is significantly smaller than that of a load, the arrangement being such that a voltage at the output of the controller is allowed to "collapse" every cycle.

4. A controller as claimed in claim 1, having a plurality of elements which are subject to differential ageing, the controller being arranged to drive the elements so as to compensate for said differential ageing such that the elements are illuminated at substantially equal brightness throughout the useful lifetime of the display.

5. A controller as claimed in claim 1, the controller being arranged to vary a relative phase of signals applied to illuminated segment(s) of the display whereby the brightness of the segment(s) can be varied.

6. A controller as claimed in claim 1, wherein power supplied per unit area of the display that is illuminated is maintained during operation at a predetermined value.

7. A controller as claimed in claim 6, wherein the power supplied is maintained at the same pre-determined value as the display ages so that the voltage across the segments increases as their capacitance decreases with age.

8. A controller as claimed in claim 1, wherein the controller is arranged to provide constant predetermined power per unit area of illuminated segments of the display.

9. A controller as claimed in claim 1, wherein the controller compensates for a decrease in sensitivity of the display by providing a controlled increase in drive voltage as the display ages.

10. A controller as claimed in claim 9, wherein the controller determines the sensitivity of the display and sets a drive power accordingly to provide a desired level of display brightness.

11. A controller as claimed in claim 9, the controller being arranged to measure a voltage achieved on a load by the application of a known amount of energy, the achieved voltage, the amount of energy applied and an area being driven being used to estimate the capacitance per unit area of the display and thereby determine the sensitivity.

12. A controller as claimed in claim 1, the controller being arranged to determine a sensitivity of the display elements and to drive a plurality of elements at a voltage that provides a desired level of output brightness such that the output brightness is maintained substantially constant throughout the useful life of the display.

13. A controller as claimed in claim 12, comprising a power supply having a fly-back circuit, wherein a flow of current through an inductor is selectively interrupted in order to provide a sufficiently high voltage output to drive an electroluminescent display, the interruption of the current being controlled so as to provide a desired output power.

14. A controller as claimed in claim 1, comprising a power supply having a fly-back circuit wherein a flow of current through an inductor is selectively interrupted in order to provide a sufficiently high voltage output to drive an electroluminescent display, the interruption of the current being controlled so as to provide a desired output power.

15. A controller as claimed in claim 14, wherein the inductor current is controlled by means of an output from a pulse width modulator.

16. A controller as claimed in claim 15, wherein the pulse width is determined from the square root of the area of a plurality of segments that are to be illuminated.

17. A controller as claimed in claim 12, the controller comprising a power supply having a reservoir capacitor with a capacitance which is significantly smaller than that of a load, the arrangement being such that the voltage at the output of the controller is allowed to "collapse" every cycle.

18. A controller as claimed in claim 8, the controller comprising a power supply having a reservoir capacitor with a capacitance which is significantly smaller than that of a load, the arrangement being such that a voltage at the output of the controller is allowed to "collapse" every cycle.

19. A controller as claimed in claim 8, comprising a power supply having a fly-back circuit, wherein a flow of current through an inductor is selectively interrupted in order to provide a sufficiently high voltage output to drive an electroluminescent display, the interruption of the current being controlled so as to provide a desired output power.

20. A method of controlling an alternating current driven electroluminescent display comprising the steps of controlling a power supply to deliver a correct amount of power into a system for a given display output based upon an area of an individual segment(s) that is to be lit and supplying approximately that amount of power to the display.

21. A controller being arranged to determine an amount of power required by the display for a demanded display output based upon an area of an individual segment(s) that is to be lit and to supply approximately that amount of power to the display, wherein the controller comprises an area summation engine having a segment data input, a segment counter and a memory containing area data corresponding to the segment(s) of the display, wherein, based on the input from the segment data input, the area(s) of the segment(s) that are to be lit are obtained from the memory and summed to provide an output corresponding to the total area to be lit.

22. An alternating current driven electroluminescent display in combination with a controller, wherein the controller determines an amount of power required by the display for a demanded display output based upon an area of the individual segment(s) that is to be lit and to supply approximately that amount of power to the display.

23. An electroluminescent display as claimed in claim 22, having a plurality of elements which are subject to differential ageing, in combination with a controller, the controller being arranged to drive the elements so as to compensate for said differential ageing such that the elements are illuminated at substantially equal brightness throughout the useful lifetime of the display.

24. An electroluminescent display as claimed in claim 22, the controller being arranged to determine a sensitivity of the display elements and to drive a plurality of elements at a voltage that provides a desired level of output brightness such that the output brightness is maintained substantially constant throughout the useful life of the display.

25. An electroluminescent display as claimed in claim 22, wherein the controller is arranged to provide constant predetermined power per unit area of illuminated segments of the display.

* * * * *